United States Patent
Takasu et al.

(10) Patent No.: US 10,109,824 B2
(45) Date of Patent: Oct. 23, 2018

(54) BATTERY AND MANUFACTURING METHOD FOR BATTERY

(71) Applicant: TOYOTA JIDOSHA KABUSHIKI KAISHA, Toyota-shi, Aichi-ken (JP)

(72) Inventors: Junta Takasu, Nagoya (JP); Hiroki Ishida, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 205 days.

(21) Appl. No.: 15/333,642

(22) Filed: Oct. 25, 2016

(65) Prior Publication Data

US 2017/0117510 A1 Apr. 27, 2017

(30) Foreign Application Priority Data

Oct. 27, 2015 (JP) ................... 2015-211203

(51) Int. Cl.
| | | |
|---|---|---|
| H01M 2/02 | (2006.01) | |
| B23K 26/26 | (2014.01) | |
| H01M 2/30 | (2006.01) | |
| H01M 10/04 | (2006.01) | |
| H01M 10/0525 | (2010.01) | |

(Continued)

(52) U.S. Cl.
CPC .......... *H01M 2/0262* (2013.01); *B23K 26/24* (2013.01); *B23K 26/26* (2013.01); *H01M 2/0267* (2013.01); *H01M 2/0277* (2013.01); *H01M 2/043* (2013.01); *H01M 2/06* (2013.01); *H01M 2/26* (2013.01); *H01M 2/305* (2013.01); *H01M 10/0431* (2013.01); *H01M 10/0525* (2013.01); *B23K 2201/38* (2013.01); *H01M 2220/20* (2013.01)

(58) Field of Classification Search
CPC .. H01M 2/0262; H01M 2/0277; H01M 2/043; H01M 2/06; H01M 2/26; H01M 2/305; H01M 10/0431; H01M 10/0525; B23K 26/24; B23K 26/26
See application file for complete search history.

(56) References Cited

U.S. PATENT DOCUMENTS

| | | |
|---|---|---|
| 2014/0004408 A1 | 1/2014 | Ehara |
| 2014/0377625 A1 | 12/2014 | Tsutsumi et al. |
| 2015/0180004 A1 | 6/2015 | Harayama |

FOREIGN PATENT DOCUMENTS

| | | |
|---|---|---|
| JP | 2010-33766 A | 2/2010 |
| JP | 2014-6977 A | 1/2014 |

(Continued)

*Primary Examiner* — Helen Oi K Conley
(74) *Attorney, Agent, or Firm* — Sughrue Mion, PLLC (57) ABSTRACT

A battery includes a battery case; an outside member that is arranged on an outer portion of the battery case, and is made of an Al—Mg alloy or Al—Mg—Si alloy; a collector member made of pure aluminum, which has i) an extending portion that extends from within the battery case, passes through a first through-hole provided in the battery case and a second through-hole in the outside member, and protrudes out of the battery case, and ii) a crimped portion that spreads out toward an outside of the second through-hole from the extending portion, and circularly covers a periphery of the second through-hole in the outside member; as well as a bead that electrically connects an outer peripheral edge portion of the crimped portion to the outside member; and an additional bead that is positioned farther toward a radial inside of the crimped portion than the bead.

9 Claims, 10 Drawing Sheets

(51) Int. Cl.
*B23K 26/24* (2014.01)
*H01M 2/04* (2006.01)
*H01M 2/06* (2006.01)
*H01M 2/26* (2006.01)
*B23K 101/38* (2006.01)

(56) References Cited

FOREIGN PATENT DOCUMENTS

| JP | 2014-011073 A | 1/2014 |
| JP | 2015-8087 A | 1/2015 |
| WO | 2013/031669 A1 | 3/2013 |

FIG. 9
COMPARATIVE ART

FIG. 10
COMPARATIVE ART

BATTERY AND MANUFACTURING METHOD FOR BATTERY

INCORPORATION BY REFERENCE

The disclosure of Japanese Patent Application No. 2015-211203 filed on Oct. 27, 2015 including the specification, drawings and abstract is incorporated herein by reference in its entirety.

BACKGROUND

1. Technical Field

The disclosure relates to a battery and a manufacturing method for a battery.

2. Description of Related Art

One known battery in which an electrode body is housed inside a battery case, is such that a collector member that is connected to an electrode body inside the battery case extends out of the battery case, and the extending portion of the collector member and an outside member that is arranged outside the battery case and in which the extending portion is inserted through a through-hole in the outside member are fixed by a crimped portion of the collector member being crimped and deformed (see Japanese Patent Application Publication No. 2014-11073 (JP 2014-11073 A) for example).

With the battery described in JP 2014-11073 A, the outside member and the crimped portion of the collector member that circularly covers the periphery of the through-hole in this outside member are welded together, such that the outside member and the collector member are electrically connected. More specifically, an example is given in which the outside member and a peripheral edge portion of the crimped portion are welded by laser light in a scattered manner (specifically at four points in the circumferential direction) (see FIGS. 3, 5, and 6 of JP 2014-11073 A).

SUMMARY

However, it has been found that, when a forming spot-like bead (a weld) by laser welding, cracking may occur at a portion of the bead, which is toward inside in the radial direction of the crimped portion. If cracking occurs in the bead, the conductive resistance between the crimped portion of the collector member and the outside member via the bead increases, and thus battery resistance increases, which is undesirable.

Such cracking is thought to occur in the manner described below. Pure aluminum that is easily deformed is used for the collector member (the crimped portion), while an Al—Mg alloy or Al—Mg—Si alloy, both of which have high strength, is used for the outside member. Pure aluminum has a greater coefficient of thermal expansion than the Al—Mg alloy or Al—Mg—Si alloy. Meanwhile, the bead is made of an alloy in which the pure aluminum is mixed with the aluminum alloy, and the coefficient of thermal expansion of the alloy that the bead is made of is a value between those of the pure aluminum and the aluminum alloy. That is, the bead (the alloy) has a lower coefficient of thermal expansion than the crimped portion (the pure aluminum). Therefore, as the solidified bead thermally contracts as its temperature decreases, thermal stress due to the difference in thermal expansion occurs between the crimped portion and the bead formed on the outer peripheral edge portion of this crimped portion. In particular, because the bead is formed on the peripheral edge portion of the crimped portion, thermal stress occurs between the bead and a portion of the crimped portion that is farther to the radial inside than the bead. It is therefore thought that cracking tends to occur in a portion of the bead that is toward inside in the radial direction of the crimped portion.

The disclosure thus provides a battery having an outside member that is fixed to a battery case by a crimped portion of a collector member that passes through the battery case and protrudes outside the battery case, in which a bead that improves electrical conduction between the outside member and the crimped portion of the collector member is inhibited from cracking, such that good conductivity between the outside member and the crimped portion of the collector member by the bead is able to be ensured. The disclosure also provides a manufacturing method for such a battery.

A first aspect of the disclosure relates to a battery that includes a battery case; an outside member that is arranged on an outer portion of the battery case, and is made of an Al—Mg alloy or Al—Mg—Si alloy; a collector member made of pure aluminum, which has i) an extending portion that extends from within the battery case, passes through a first through-hole provided in the battery case and a second through-hole that passes through the outside member, and protrudes out of the battery case, and ii) a crimped portion that spreads out toward an outside of the second through-hole from the extending portion, and circularly covers a periphery of the second through-hole in the outside member, and fixes the extending portion and the outside member to the battery case; a bead that is made of a first alloy derived from the crimped portion and the outside member, and electrically connects an outer peripheral edge portion of the crimped portion to the outside member; and an additional bead that is made of a second alloy derived from the bead and the crimped portion, and is positioned farther toward a radial inside of the crimped portion than the bead.

With this battery, the additional bead is provided to the inside of the bead, in the radial direction of the crimped portion, in a manner in which the additional bead overlaps with the bead. That is, the portion of the bead, which is to the radial inside of the crimped portion where cracking tends to occur, is the additional bead, instead of the bead. This additional bead is made of a second alloy of the first alloy and the pure aluminum, which is derived from the bead and the crimped portion. Therefore, a difference in thermal expansion between the additional bead made of the second alloy and the crimped portion around the additional bead is smaller than the difference in thermal expansion between the bead made of the first alloy and the crimped portion around the bead. Hence, unlike the bead, the additional bead will not easily crack due to a difference in thermal expansion. Thus, with this battery, it is possible to inhibit a crack from occurring in the bead, so good electrical conductivity between the outside member and the crimped portion of the collector member by the bead is able to be ensured.

Furthermore, the battery may be provided with a second additional bead that is made of a third alloy derived from the additional bead and the crimped portion, and is positioned farther to the radial inside of the crimped portion than the additional bead. Also, the shapes of the bead and the additional bead are both described as being spot-shaped. Aside from this, a continuous bead in which a plurality of spot-shaped beads are continuous and partially overlapping each other in a circumferential direction of the crimped portion, and a continuous additional bead in which a plurality of spot-shaped additional beads are continuous and partially overlapping each other in a circumferential direction of the crimped portion, are also possible. Also, a linear (strip-shaped) bead and a linear (strip-shaped) additional bead that are lineally (in a strip) and continuously melted by moving a laser spot in the circumferential direction of the crimped portion while emitting laser light, may also be formed. A plurality of the beads and the additional beads may also be arranged scattered in the circumferential direction of the crimped portion (for example, in four locations each separated by 90 degrees in the circumferential direction of the crimped portion, similar to JP 2014-11073 A). Also, one each of the continuous bead and the continuous additional bead may be provided, or a plurality of both the continuous beads and the continuous additional beads may be arranged scattered in the circumferential direction of the crimped portion. The collector member may be a collector member that has, inside the battery case, an electrode body conductive portion that is electrically connected to an electrode body that is housed inside the battery case, in which an extending member extends from this electrode body conductive portion. Aside from this, the collector member may also be a collector member that has a separate electrode body conductive member that is electrically connected to the electrode body, and the collector member may be connected by welding or the like to this electrode body conductive member inside the battery case. Also, the collector member may be a collector member that is connected to a member such as a CID (Circuit Interrupt Device) that interrupts current flowing to the collector member when the internal pressure in the battery rises.

One example of the pure aluminum that the collector member is made of is JIS 1000 series aluminum material. More specifically, for example, a pure aluminum such as A1100, A1050, or A1060 may be used. With all of these materials, the purity of the aluminum is equal to or greater than 99%. Also, one example of the Al—Mg alloy or Al—Mg—Si alloy that the outside member is made of is JIS 5000 series or 6000 series aluminum alloy material. More specifically, an aluminum alloy such as A5056, A5052, A5454, A6061, or A6063 may be used.

With the battery described above, the bead may be a continuous bead in which a plurality of spot-shaped beads are continuous and partially overlapping each other in a circumferential direction of the crimped portion, and the additional bead may be a continuous additional bead in which a plurality of spot-shaped additional beads are continuous and partially overlapping each other in a circumferential direction of the crimped portion. Also, the outside member may include a conductive portion that abuts against, and is electrically connected to, an external terminal, and the continuous bead may be positioned on a portion of the outer peripheral edge portion of the crimped portion, which is closest to the conductive portion of the outside member.

With this battery, a continuous additional bead is provided in addition to the continuous bead. As a result, cracking in the spot-shaped beads that form the continuous bead is able to be inhibited. Also, the beads (the continuous bead) electrically connect the collector member and the outside member together. As described above, when the continuous bead is positioned on a portion of the outer peripheral edge portion of the crimped portion, which is closest to the conductive portion of the outside member, current is able to flow to the crimped portion along the shortest path from the conductive portion to the bead, from among the paths from the external terminal to the crimped portion (the collector member) via the outside member, so conductive resistance from the external terminal to the collector member is reduced.

Moreover, in the battery described above, an insulating member made of insulating resin, which insulates the collector member and the outside member from the battery case, may be provided.

When the insulating member made of insulating resin is provided between the collector member and the outside member, and the battery case, the temperature near the portion of each member where the laser light is emitted rises by the heat input from the laser light emission, and the insulating member (the insulating resin) that contacts this may deform and transform or the like due to the heat, and as a result, the insulating properties may decrease. However, in the battery described above, each of the beads that form the continuous bead, and each of the additional beads that form the continuous additional bead, are spot-shaped. Therefore, the laser lights are emitted intermittently, and there is time between one emission and the next emission, so during this time, heat can be transferred to another portion of the outside member and another portion of the collector member, so the transfer of heat to the insulating member is able to be reduced. As a result, the battery described above is able to be a highly reliable battery in which deformation and transformation due to heat of the insulating member that is made of insulating resin are inhibited, while having the continuous bead and the continuous additional bead.

A second aspect of the disclosure relates to a manufacturing method for a battery that includes a battery case; an outside member that is arranged on an outer portion of the battery case, and is made of an Al—Mg alloy or Al—Mg—Si alloy; and a collector member made of pure aluminum, which has i) an extending portion that extends from within the battery case, passes through a first through-hole provided in the battery case and a second through-hole that passes through the outside member, and protrudes out of the battery case, and ii) a crimped portion that spreads out toward an outside of the second through-hole from the extending portion, and circularly covers a periphery of the second through-hole in the outside member, and fixes the extending portion and the outside member to the battery case. This manufacturing method includes forming a bead that is made of a first alloy derived from the crimped portion and the outside member, by emitting a first laser light toward a portion of an outer peripheral edge portion of the crimped portion and a portion of the outside member that is covered by a portion of the outer peripheral edge portion; and forming an additional bead that is made of a second alloy derived from the bead and the crimped portion, by emitting a second laser light to an inside of the formed bead, in a radial direction of the crimped portion.

With the manufacturing method for this battery, the additional bead is formed after the bead is formed, so the bead is able to be inhibited from cracking. As a result, a battery in which good electrical conductivity between the outside member and the crimped portion of the collector member by the bead is ensured, is able to be manufactured.

Furthermore, in the manufacturing method described above, the bead may form a continuous bead in which a plurality of spot-shaped beads are continuous and partially overlapping each other in a circumferential direction of the crimped portion, and the additional bead may form a continuous additional bead in which a plurality of spot-shaped additional beads are continuous and partially overlapping each other in a circumferential direction of the crimped portion. Also, the spot-shaped beads may each be formed by fixing a laser emitting position and emitting the first laser light, the spot-shaped additional beads may each be formed by fixing a laser emitting position and emitting the second laser light, and the continuous bead and the continuous additional bead may be formed by forming the beads and the additional beads alternately.

With this battery manufacturing method, the continuous bead and the continuous additional bead are formed by repeatedly first forming one of the beads and then forming one of the additional beads. That is, after inhibiting a crack from occurring in the bead by forming the additional bead after forming the bead, the next bead is then formed. Therefore, a crack that occurs in one bead is less likely to influence the development of a crack in an adjacent bead, so a continuous bead in which the occurrence of cracks is able to be inhibited and a plurality of beads are continuous, is able to be formed.

Moreover, in the battery manufacturing method described above, the outside member may include a conductive portion that abuts against, and is electrically connected to, an external terminal, and the continuous bead may be formed on a portion of the outer peripheral edge portion of the crimped portion, which is closest to the conductive portion of the outside member.

With this battery manufacturing method, a battery in which current is able to flow to the crimped portion along the shortest path in the outside member, from the conductive portion of the outside member that abuts against the external terminal to the bead, from among the paths from the external terminal to the crimped portion (the collector member) via the outside member, so conductive resistance from the external terminal to the collector member is reduced, is able to be manufactured.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
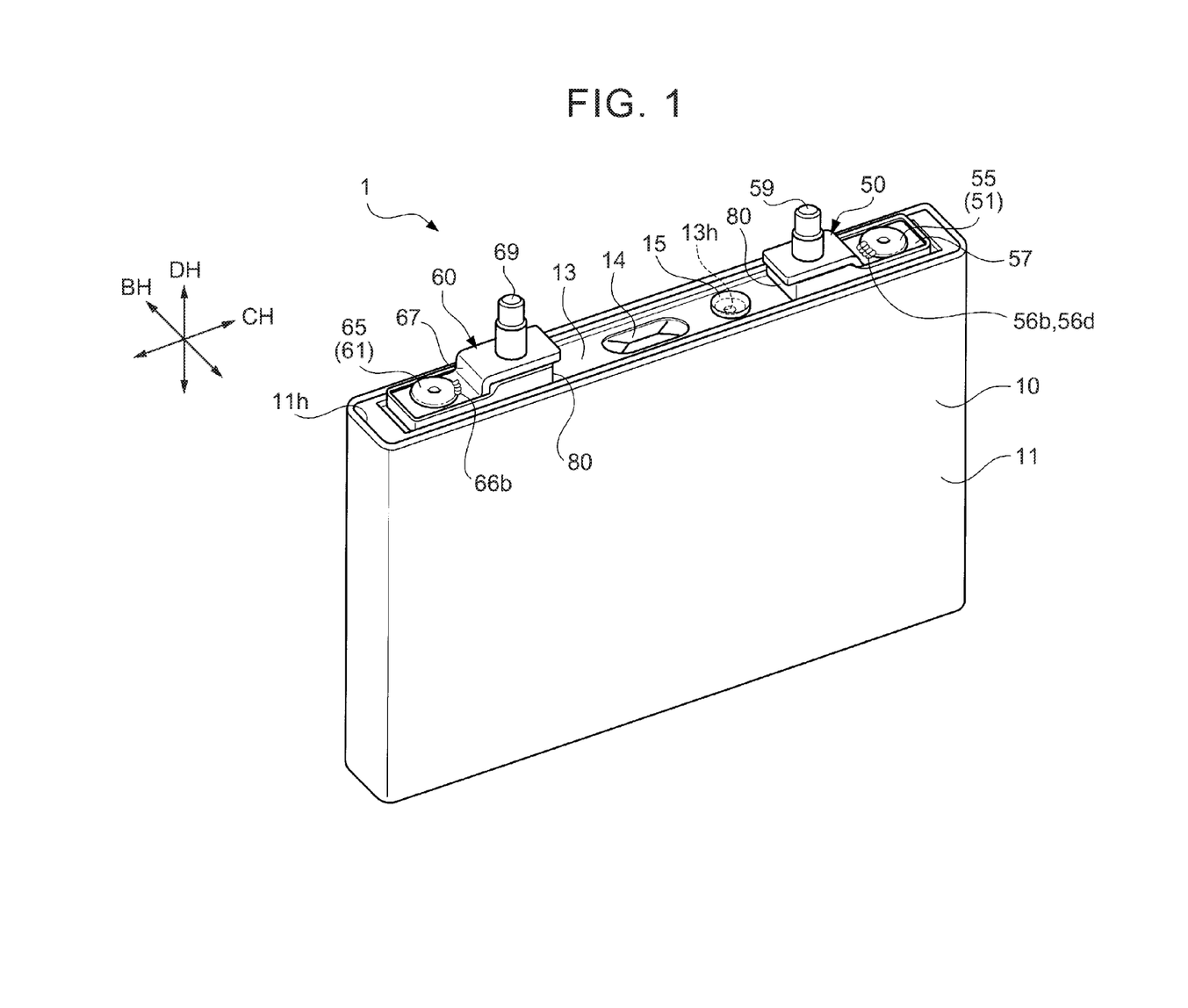
FIG. 1 is a perspective view of a battery according to one example embodiment.
Figure 2:
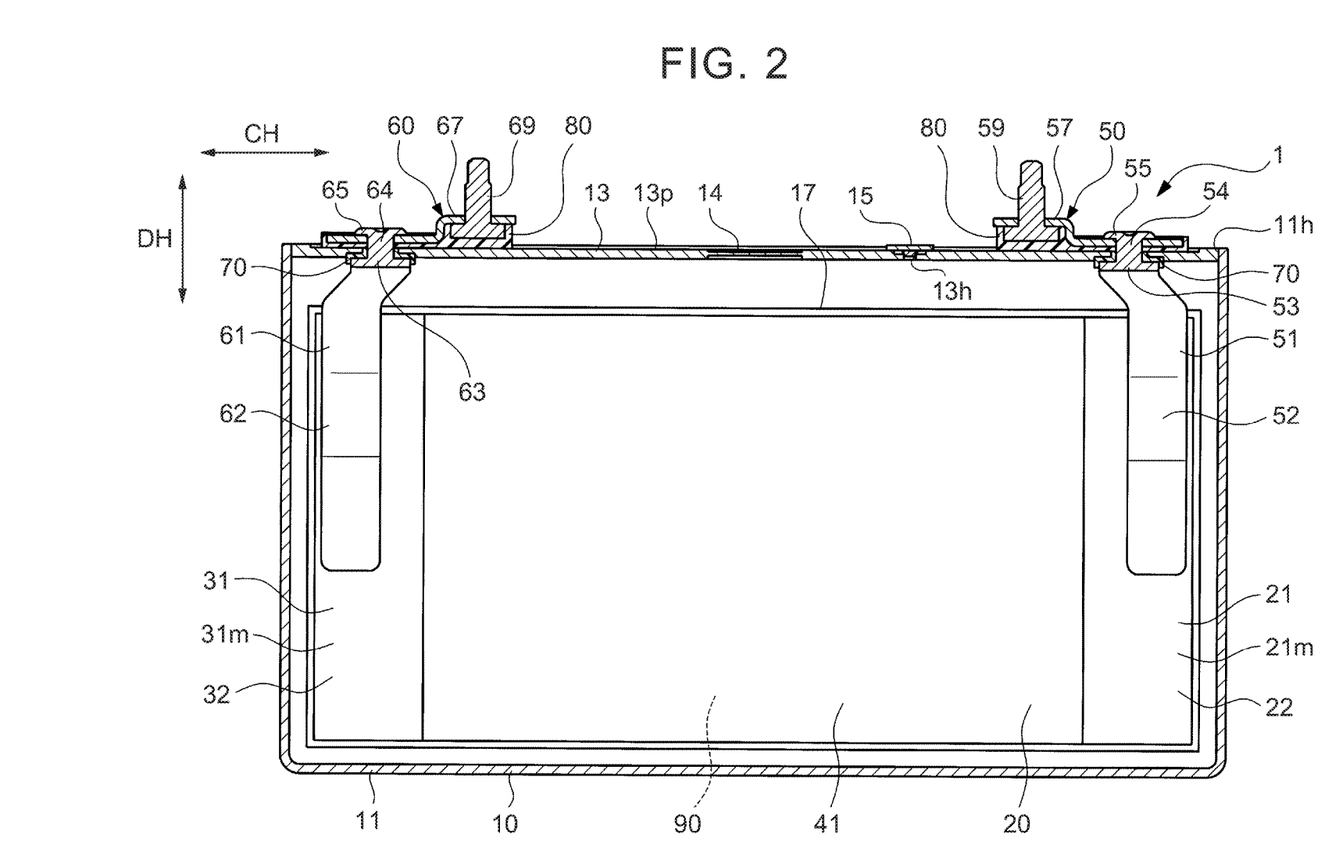
FIG. 2 is a longitudinal sectional view of the battery according to the example embodiment.
Figure 3:
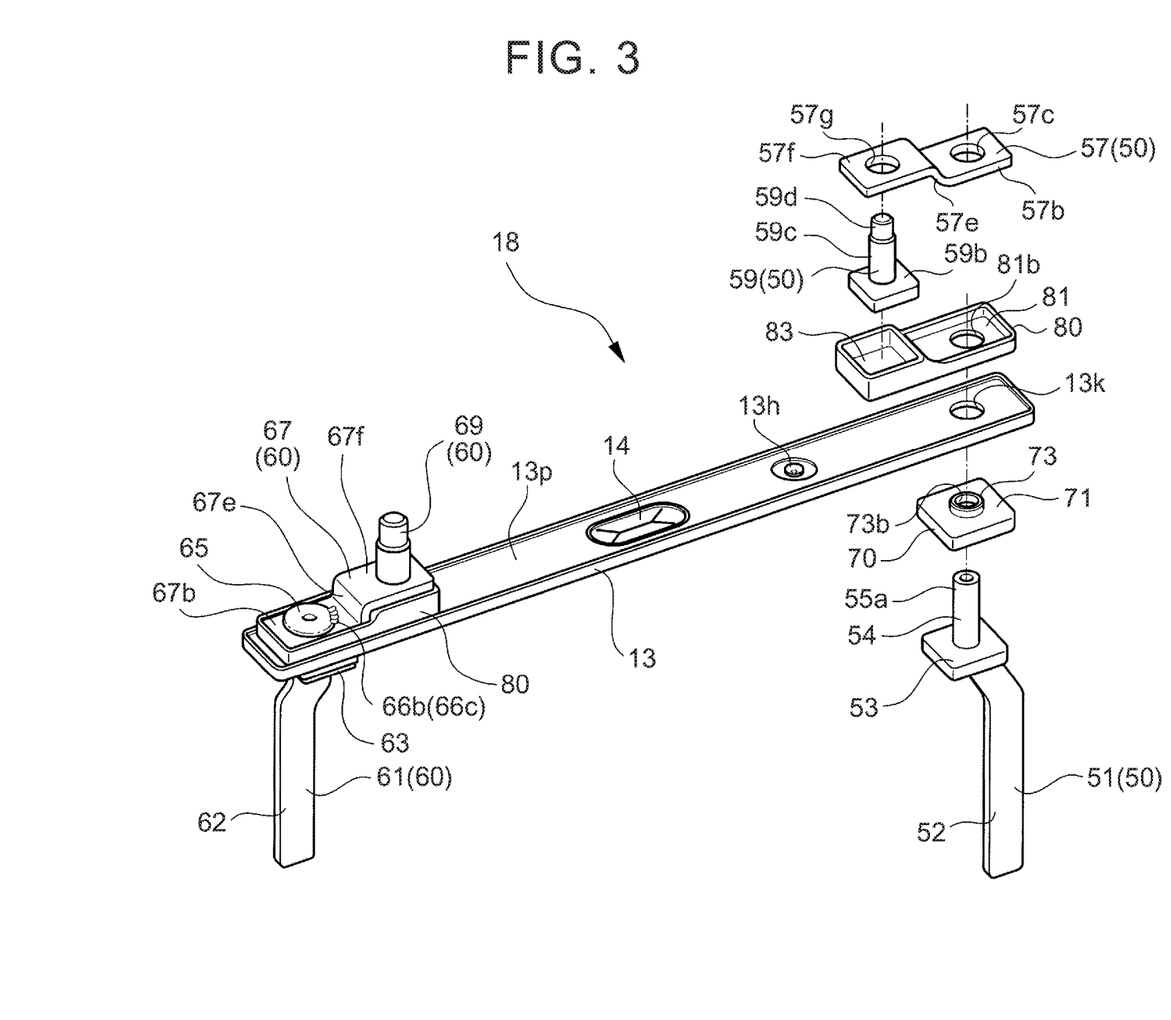
FIG. 3 is an exploded perspective view of a case lid with terminal members, according to the example embodiment.
Figure 4:
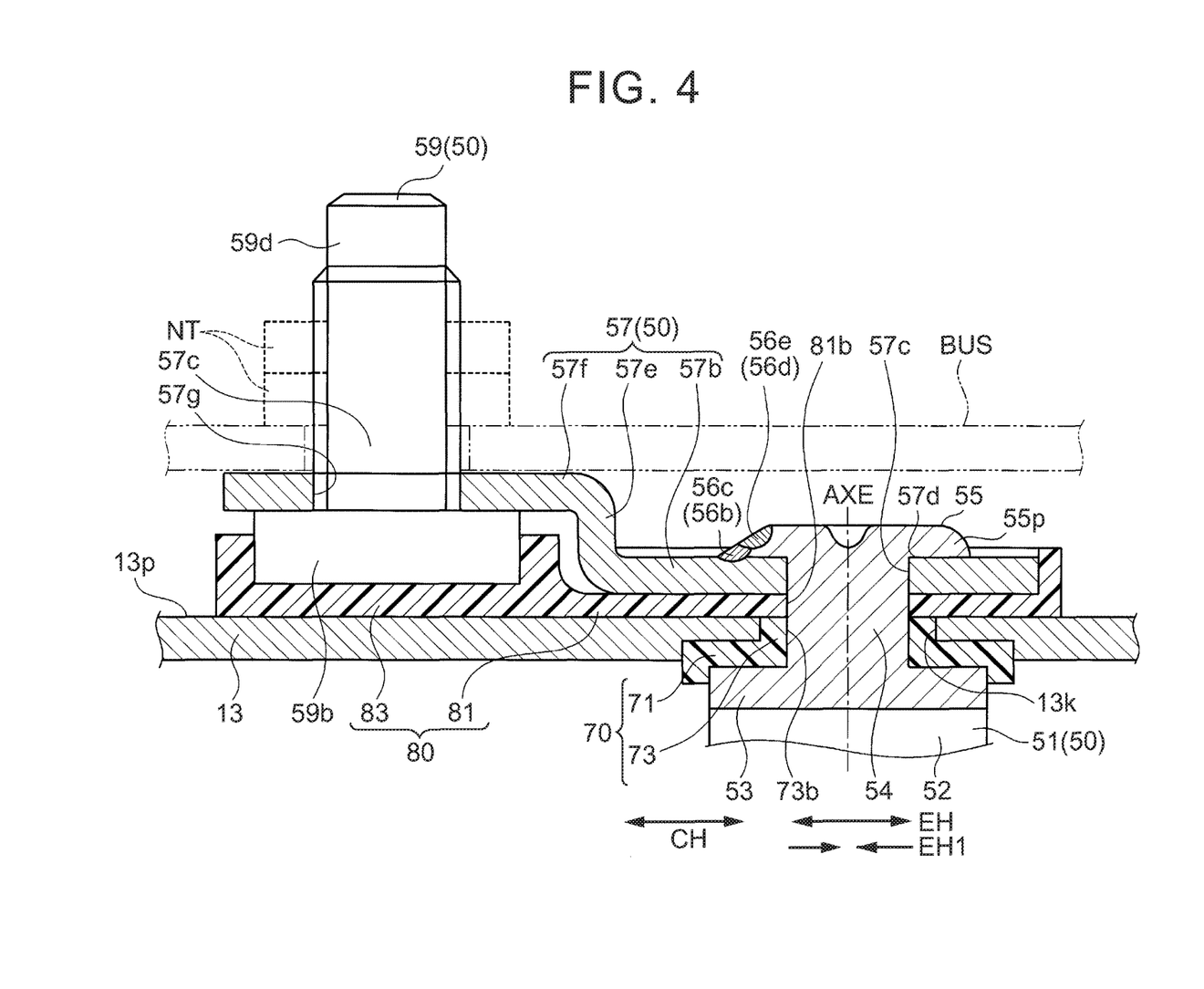
FIG. 4 is a partial sectional view of the structure near a positive terminal member, in the battery according to the example embodiment.
Figure 5:
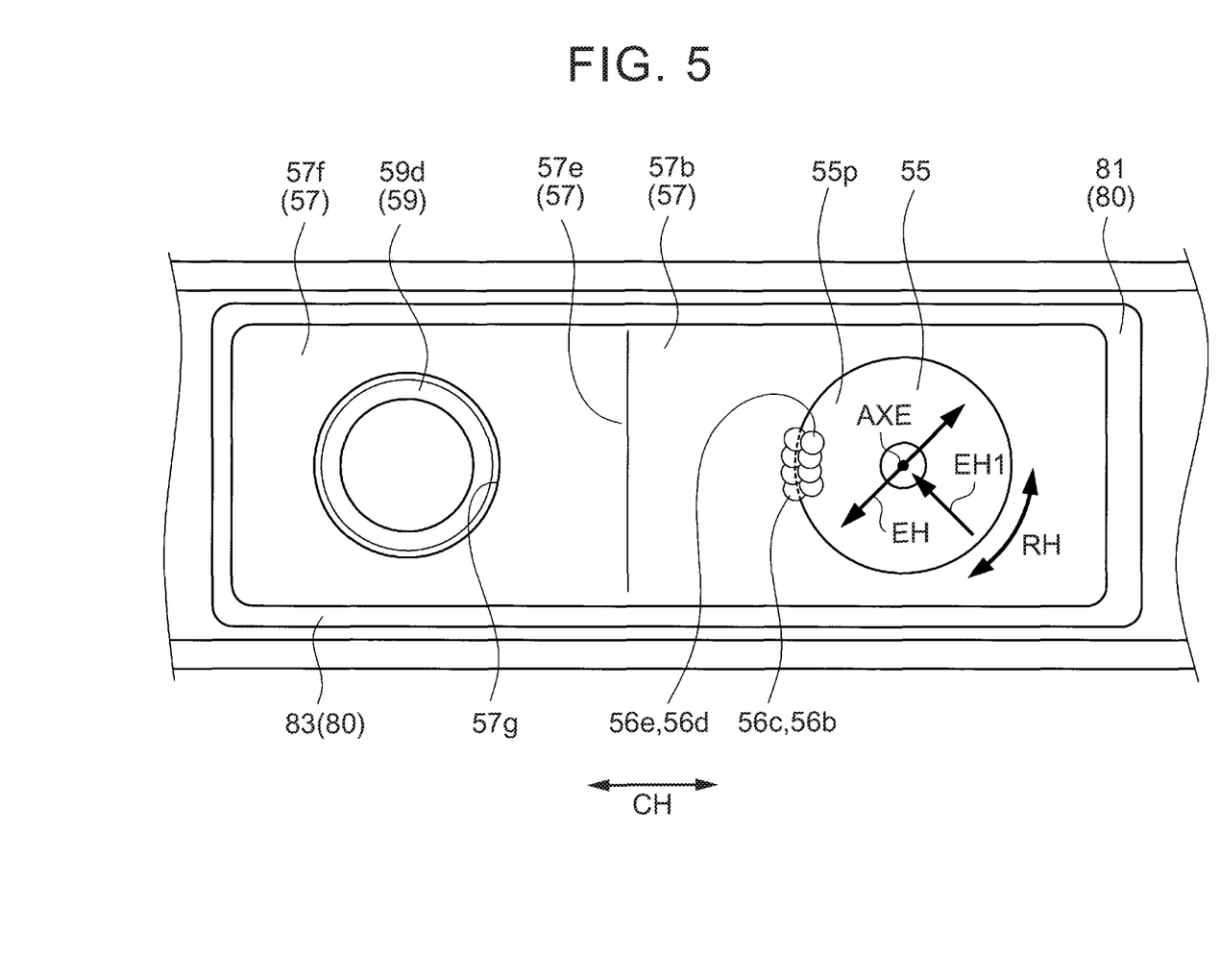
FIG. 5 is a partial plan view of the configuration near the positive terminal member, in the battery according to the example embodiment.

Hereinafter, example embodiments of the disclosure will be described with reference to the accompanying drawings. FIG. 1 is a perspective view and FIG. 2 is a longitudinal sectional view, of a lithium-ion secondary battery (hereinafter, simply referred to as "battery") 1 according to one example embodiment. Also, FIG. 3 is an exploded perspective view of a case lid with terminal members, in which a positive terminal member 50 and a negative terminal member 60 are assembled to a case lid member 13. Further, FIG. 4 is a partial sectional view of the structure of an area near the positive terminal member 50, in the battery 1. Moreover, FIG. 5 is a partial plan view of the structure of the area near the positive terminal member 50, in the battery 1. In the description below, a battery thickness direction BH, a battery transverse direction CH, and a battery longitudinal direction DH of the battery 1, will be defined as the directions shown in FIGS. 1 and 2.

This battery 1 is a square, sealed lithium-ion secondary battery that is mounted in a vehicle such as a hybrid vehicle or an electric vehicle. This battery 1 includes a battery case 10, an electrode body 20 that is housed inside the battery case 10, and the positive terminal member 50 and the negative terminal member 60 that are fixed to the battery case 10, and the like. Also, electrolyte (non-aqueous electrolyte) 90 is housed inside the battery case 10, and some of this electrolyte 90 is impregnated in the electrode body 20.

Of these, the battery case 10 has a rectangular box shape and is made of metal (aluminum in this example embodiment). This battery case 10 includes a closed-end angular tube-shaped case main body member 11 that is open only on the upper side, and a rectangular plate-shaped case lid member 13 that is welded over an opening 11h of this case main body member 11 and closes off this opening 11h. A safety valve 14 that breaks and opens when the internal pressure of the battery case 10 reaches a predetermined pressure is provided in the case lid member 13. Also, an electrolyte filler hole 13h that communicates the inside of the battery case 10 with the outside of the battery case 10 is formed in this case lid member 13, and is hermetically sealed by an electrolyte filler hole sealing member 15.

Also, in the positive terminal member 50 that includes a positive electrode collector member 51 made of aluminum, a positive electrode outside member 57, and a positive electrode connecting bolt 59, the positive electrode collector member 51 and the positive electrode outside member 57 are insulated from, and securely fixed to, the case lid member 13 via an inside insulating member 70 and an outside insulating member 80 that are both made of insulating resin. One end of this positive terminal member 50 (i.e., the positive electrode collector member 51) is connected, as well as electrically connected, to a positive electrode exposed portion 21m of a positive electrode plate 21 of the electrode body 20 that will be described later, inside the battery case 10. The positive terminal member 50 (i.e., the positive electrode collector member 51) passes through the case lid member 13 and extends outside the battery 1, and the other end of the positive terminal member 50 (i.e., the positive electrode outside member 57) forms a positive terminal of the battery 1.

Moreover, in the negative terminal member 60 that includes a negative electrode collector member 61 made of copper, a negative electrode outside member 67, and a negative electrode connecting bolt 69, the negative electrode collector member 61 and the negative electrode outside member 67 are insulated from, and securely fixed to, the case lid member 13 via the inside insulating member 70 and the outside insulating member 80 that are both made of insulating resin. One end of this negative terminal member 60 (i.e., the negative electrode collector member 61) is connected, as well as electrically connected, to a negative electrode exposed portion 31*m* of a negative electrode plate 31 of the electrode body 20, inside the battery case 10. The negative terminal member 60 (i.e., the negative electrode collector member 61) passes through the case lid member 13 and extends outside the battery 1, and the other end of the negative terminal member 60 (i.e., the negative electrode outside member 67) forms a negative terminal of the battery 1.

Next, the electrode body 20 will be described (see FIG. 2). This electrode body 20 has a flat shape, and is housed inside the battery case 10, in a state laid on its side such that an axis of the electrode body 20 is parallel to the battery transverse direction CH. A bag-shaped film surrounding body 17 that is made of insulating film and has an opening on one end side (upward in FIG. 2) is arranged between the electrode body 20 and the battery case 10, and insulates the electrode body 20 from the battery case 10. The electrode body 20 is formed by the strip-shaped positive electrode plate 21 and the strip-shaped negative electrode plate 31 that have been overlapped via a pair of strip-shaped separators 41, rolled around the axis, and then pressed into a flat shape.

In this electrode body 20, the positive electrode exposed portion 21*m* in which positive electrode collector foil 22 of the positive electrode plate 21 is exposed, is provided on one side (the right in FIG. 2) of the axis, and a negative electrode exposed portion 31*m* in which negative electrode collector foil 32 of the negative electrode plate 31 is exposed, is provided on the other side (the left in FIG. 2) of the axis. A collector portion 52 of the positive electrode collector member 51 described above is welded to the positive electrode exposed portion 21*m*. Also, a collector portion 62 of the negative electrode collector member 61 described above is welded to the negative electrode exposed portion 31*m*.

The positive electrode collector member 51 of the positive terminal member 50 has the collector portion 52 that is arranged inside the battery case 10, and an extending portion 54 that extends from this collector portion 52 and protrudes outside the battery case 10, as shown in FIGS. 1 to 3. Aside from being welded to the positive electrode exposed portion 21*m*, the collector portion 52 includes an engaging portion 53 that engages with the case lid member 13 via the rectangular plate-shaped inside insulating member 70 that will be described later. The extending portion 54 has a solid circular cylindrical shape that extends from the center of the engaging portion 53 of the collector portion 52. A tip end portion of this extending portion 54 has a cylindrical shape and is a designed crimping portion 55*a* that is to be crimped and deformed as will be described later. This positive electrode collector member 51 is made of pure aluminum (A1050) so that the designed crimping portion 55*a* is able to deform easily, and because pure aluminum has good electrical conductivity (has low specific volume resistivity).

Meanwhile, as shown in FIG. 3, the positive electrode outside member 57 of the positive terminal member 50 is formed from a flat member that has been bent into a crank shape, and includes a flat plate-shaped crimping seat portion 57*b* that forms a seat for a crimped portion 55 that will be described later, a step portion 57*e* that is bent in a stepped shape, and a flat plate-shaped external terminal abutting portion 57*f* that engages with the positive electrode connecting bolt 59, described next, and contacts an external terminal such as a bus bar BUS or the like. A second through-hole 57*c* through which the extending portion 54 of the positive electrode collector member 51 is inserted, is bored in the crimping seat portion 57*b*, and a bolt through-hole 57*g* through which an external thread portion 59*c* of the positive electrode connecting bolt 59 is inserted, is bored in the external terminal abutting portion 57*f*. The positive electrode outside member 57 is made of an Al—Mg alloy or Al—Mg—Si alloy (A5052). This is because, compared to the positive electrode collector member 51, the positive electrode outside member 57 must be strong enough so that it will not easily deform when the bus bar (the external terminal) is fastened, as will be described later.

Also, the positive electrode connecting bolt 59 of the positive terminal member 50 includes a rectangular plate-shaped head portion 59*b*, an external thread portion 59*c* that extends from the center portion of this head portion 59*b* and on which an external thread is formed, and a circular cylindrical shaped shaft portion 59*d* that is positioned on a tip end portion of the external thread portion 59*c*, as shown in FIG. 3. The positive electrode connecting bolt 59 is also made of an Al—Mg alloy or Al—Mg—Si alloy (JIS 5000 series or 6000 series aluminum alloy material, e.g., A5052). This is because the external thread portion 59*c* is provided, so the positive electrode connecting bolt 59 must be strong enough so that it will not easily deform when the bus bar (external terminal) that will be described later is fastened.

The inside insulating member 70 is made of elastically deformable resin that has electrical insulating properties. This inside insulating member 70 includes a cover portion 71 that covers the engaging portion 53 of the positive electrode collector member 51 from above in the battery longitudinal direction DH (above in FIG. 3) and insulates the engaging portion 53 from the case lid member 13, and a cylindrical protruding portion 73 that protrudes in a cylindrical shape from the center of this cover portion 71 and surrounds the extending portion 54 of the positive electrode collector member 51 that has been inserted through a third through-hole 73*b* inside the cylindrical protruding portion 73. The extending portion 54 and the cylindrical protruding portion 73 that surrounds this extending portion 54 are inserted into a first through-hole 13*k* in the case lid member 13, and the cylindrical protruding portion 73 insulates the extending portion 54 from the case lid member 13.

Further, the outside insulating member 80 is also made of elastically deformable resin that has electrical insulating properties. This outside insulating member 80 abuts against an upper surface 13*p* of the case lid member 13. The outside insulating member 80 is interposed between the crimping seat portion 57*b* of the positive electrode outside member 57 and the head portion 59*b* of the positive electrode connecting bolt 59, and the upper surface 13*p* of the case lid member 13, and insulates the crimping seat portion 57*b* and the head portion 59*b* from the upper surface 13*p*. The outside insulating member 80 has a recessed seat portion accommodating portion 81 that receives the crimping seat portion 57*b* of the positive electrode outside member 57, and a recessed head portion accommodating portion 83 that receives the head portion 59*b* of the positive electrode connecting bolt 59. A fourth through-hole 81*b* through which the extending portion 54 of the positive electrode collector member 51 is inserted, is bored in approximately the center of the seat portion accommodating portion 81.

As shown in FIG. 3, in the battery 1, the engaging portion 53 of the positive electrode collector member 51, the inside insulating member 70, the case lid member 13, the outside insulating member 80, and the positive electrode outside member 57 are all overlapping in this order, and the extending portion 54 of the positive electrode collector member 51 is inserted through the third through-hole 73b of the inside insulating member 70, the first through-hole 13k of the case lid member 13, the fourth through-hole 81b of the outside insulating member 80, and the second through-hole 57c of the positive electrode outside member 57. The designed crimping portion 55a at the tip end portion of the extending portion 54 of the positive electrode collector member 51 is deformed in an umbrella shape so as to spread outward by crimping to form the crimped portion 55. Thus, the crimped portion 55 spreads toward the outside of the second through-hole 57c from the extending portion 54 by this crimping and deforming, and consequently circularly covers a through-hole peripheral portion 57d around the second through-hole 57c of the positive electrode outside member 57, and fixes the extending portion 54 and the positive electrode outside member 57 to the battery case 10. The head portion 59b of the positive electrode connecting bolt 59 is placed in the head portion accommodating portion 83 of the outside insulating member 80, and the external thread portion 59c of the positive electrode connecting bolt 59 is inserted through the bolt through-hole 57g of the positive electrode outside member 57, so the positive electrode connecting bolt 59 is unable to be removed.

Regarding the negative electrode as well, the negative terminal member 60 (i.e., the negative electrode collector member 61, the negative electrode outside member 67, and the negative electrode connecting bolt 69) of a similar configuration is securely fixed to the case lid member 13 by forming a crimped portion 65 of the negative electrode collector member 61, while maintaining insulation, by the inside insulating member 70 and the outside insulating member 80.

Figure 6:
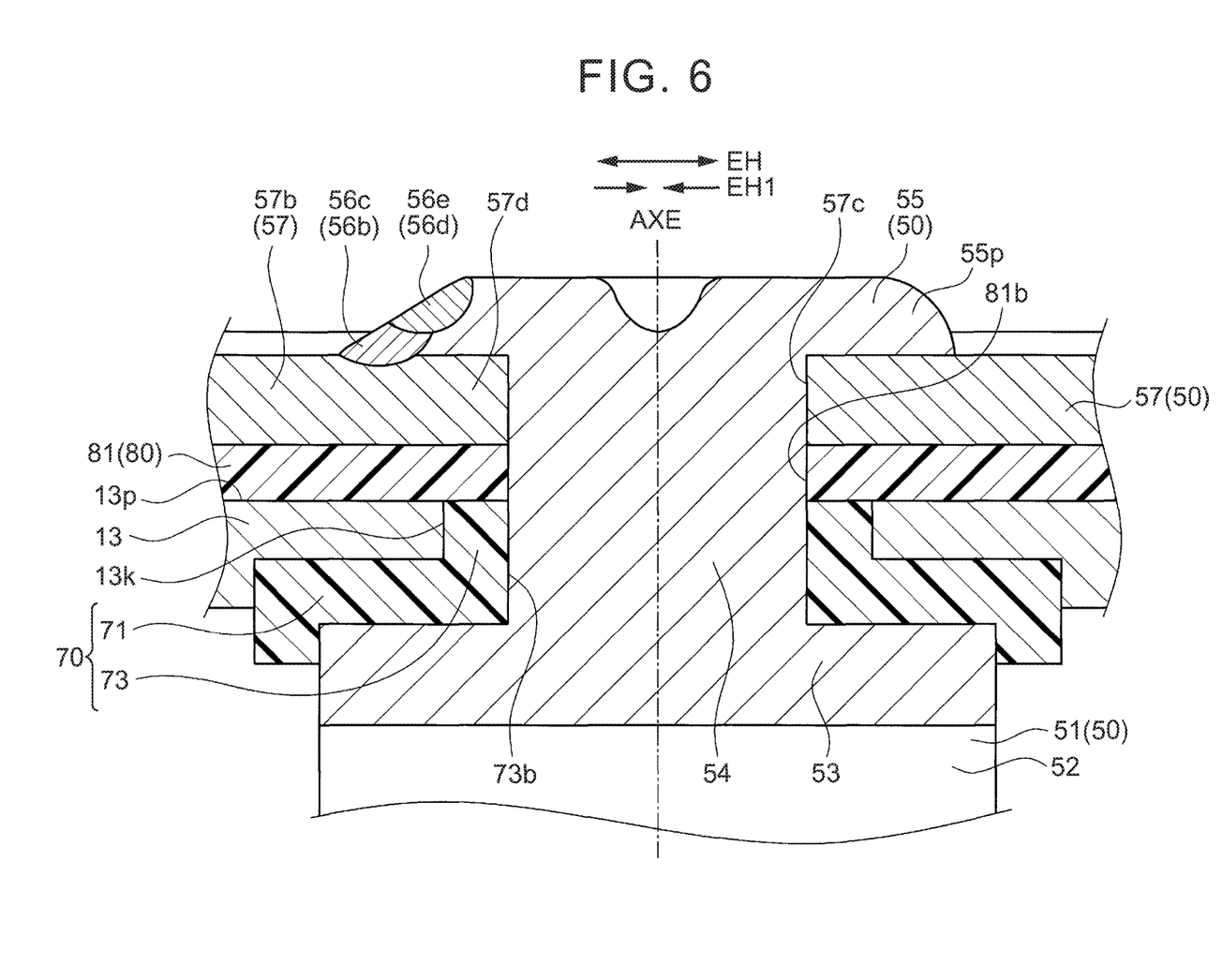
FIG. 6 is a partial enlarged sectional view of the configuration of beads and additional beads formed on a crimped portion of a collector member and an outside member, according to the example embodiment.
Figure 7:
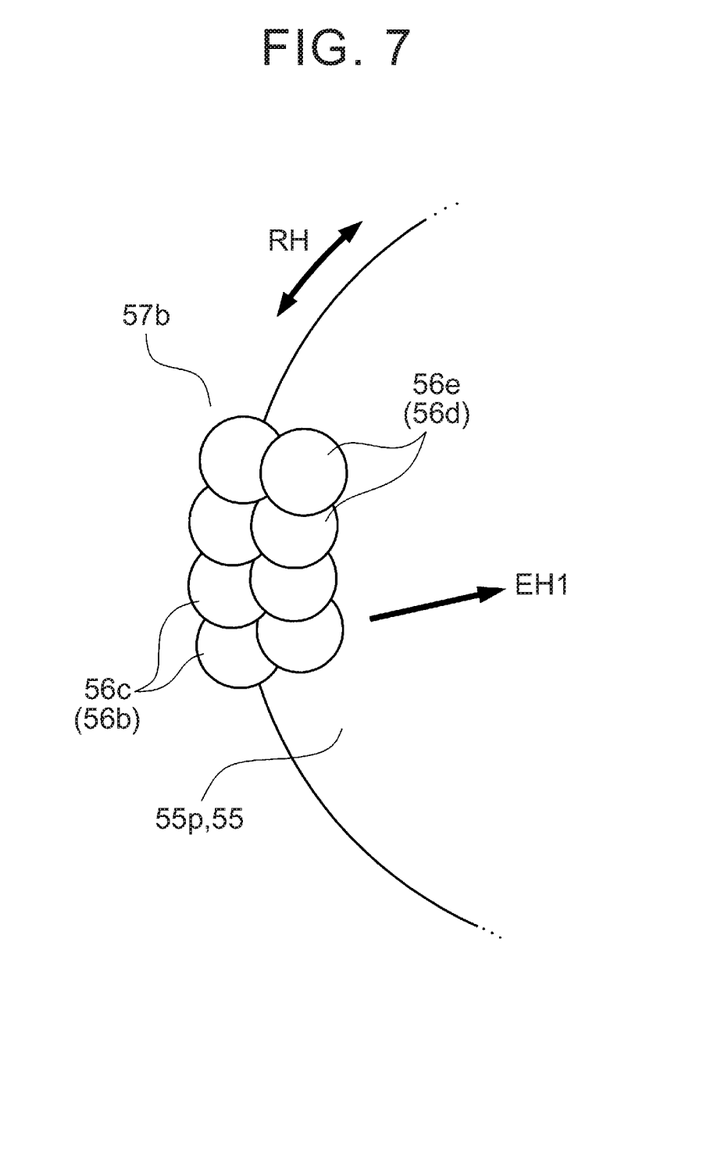
FIG. 7 is a partial enlarged plan view of the configuration of the beads and the additional beads formed on the crimped portion of the collector member and the outside member, according to the example embodiment.

Moreover, with the battery 1 of this example embodiment, the crimped portion 55 of the positive electrode collector member 51 and the crimping seat portion 57b of the positive electrode outside member 57 are welded using laser light, such that the two are electrically connected and the conductive resistance between the two is reduced (see FIGS. 4 to 7). More specifically, as shown in FIGS. 5 and 7, a continuous bead 56b that welds and electrically connects an outer peripheral edge portion 55p of the crimped portion 55 to the positive electrode outside member 57, is formed on the outer peripheral edge portion 55p of the crimped portion 55. This continuous bead 56b is formed by a plurality of (four in this example embodiment) spot-like beads 56c that are continuous and partially overlapping in a circumferential direction RH around a central axis AXE of the extending portion 54 and the crimped portion 55.

In this example embodiment, each of the beads 56c is formed in a round spot-like shape when viewed from above, by emitting laser light (a first laser light L1) at one point without moving the emitting position while the laser light is being emitted (see FIG. 7). These beads 56c (the continuous bead 56b) are made of a first alloy derived from the crimped portion 55 and the positive electrode outside member 57. That is, the beads 56c (the continuous bead 56b) are made of the first alloy that is a mixture of the pure aluminum that the positive electrode collector member 51 is made of and the Al—Mg alloy that the positive electrode outside member 57 is made of, and thus exhibit a coefficient of thermal expansion between those of the pure aluminum and the Al—Mg alloy.

The continuous bead 56b is formed in a 9 o'clock position in FIG. 5, on the outer peripheral edge portion 55p of the crimped portion 55. The external terminal abutting portion 57f of the positive electrode outside member 57 is pressed against, and electrically connected to, the bus bar BUS (the external terminal) that connects with a terminal of another battery, using two nuts NT that are screwed onto the external thread portion 59c of the positive electrode connecting bolt 59, as shown by the alternate long and two short dashes lines and the broken lines in FIG. 4. Therefore, the continuous bead 56b that electrically connects the crimped portion 55 to the positive electrode outside member 57 is formed on a portion closest to the external terminal abutting portion 57f of the positive electrode outside member 57. As a result, the current path from the external terminal abutting portion 57f of the positive electrode outside member 57 to the continuous bead 56b is able to be as short as possible, so the resistance that occurs in the positive electrode outside member 57 is able to be as low as possible.

Moreover, when a direction toward the central axis AXE of the crimped portion 55, in a radial direction EH of the crimped portion 55, is a radial inside EH1, with the battery 1 of this example embodiment, a continuous additional bead 56d in which the continuous bead 56b and the crimped portion 55 have solidified after being melted, is formed partially overlapping with the continuous bead 56b, in a position farther toward the radial inside EH1 of the crimped portion 55 than the continuous bead 56b. This continuous bead 56d is formed by a plurality of (four in this example embodiment) spot-like additional beads 56e that are continuous and partially overlapping in the circumferential direction RH of the crimped portion 55. Also, all (i.e., the four) of the additional beads 56e are formed in positions farther toward the radial inside EH1 than the beads 56c, and overlapping with the beads 56c. In this example embodiment, each of the additional beads 56e is formed in a round spot-like shape when viewed from above, by emitting laser light (a second laser light L2) at one point without moving the emitting position while the laser light is being emitted (see FIG. 8). These additional beads 56e (the continuous additional bead 56d) are made of a second alloy derived from the crimped portion 55 and the beads 56c. That is, the additional beads 56e (the continuous additional bead 56d) are made of the second alloy that is a mixture of the pure aluminum that the positive electrode collector member 51 is made of and the first alloy (the pure aluminum and the Al—Mg alloy) that the beads 56c are made of, and thus exhibit a coefficient of thermal expansion between those of the pure aluminum and the first alloy. Also, the additional beads 56e of this example embodiment do not contact the positive electrode outside member 57.

Figure 9:
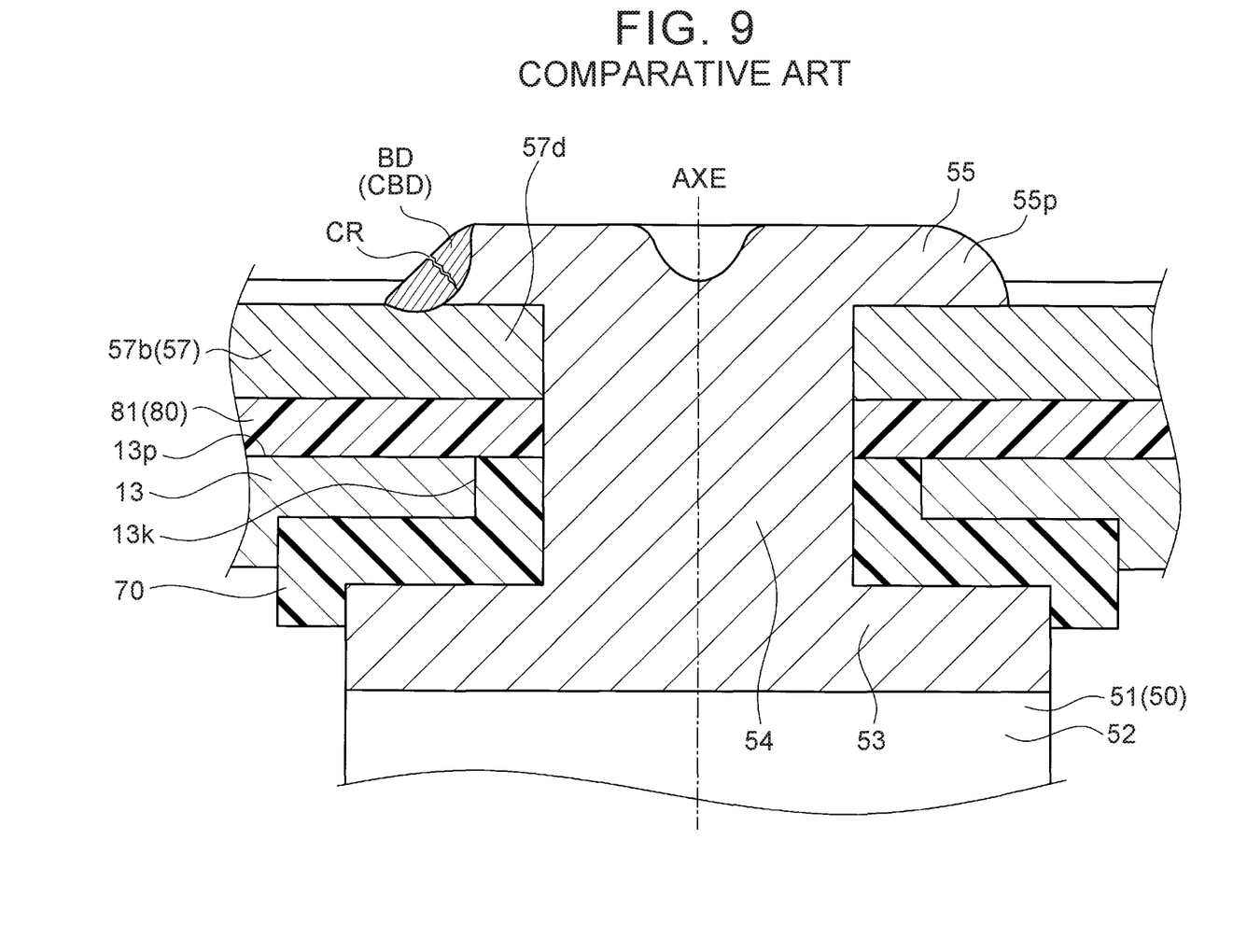
FIG. 9 is a partial enlarged sectional view of the configuration of beads formed on a crimped portion of a collector member and an outside member, according to a comparative embodiment.
Figure 10:
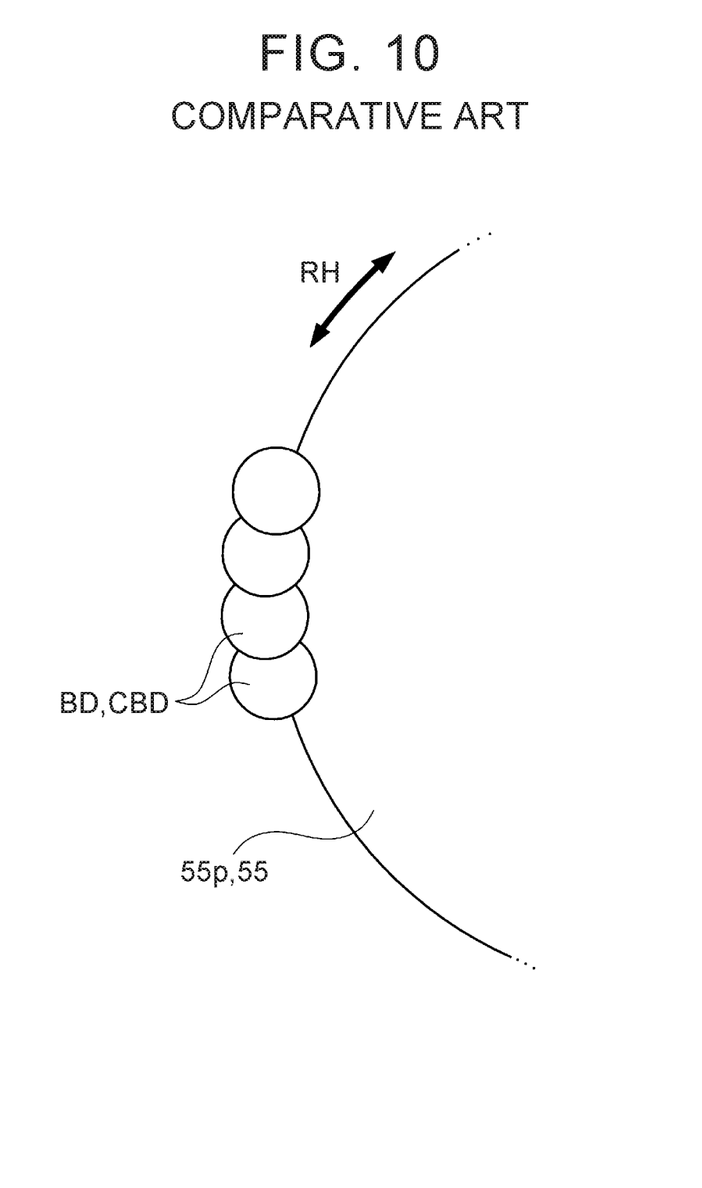
FIG. 10 is a partial enlarged plan view of the mode of the beads formed on the crimped portion of the collector member and the outside member, according to the comparative embodiment.

Unlike this example embodiment, when the additional beads 56e (i.e., the continuous additional bead 56d) are not provided, and only a continuous bead CBD (four beads BD) that welds the crimped portion 55 of the positive electrode collector member 51 to the crimping seat portion 57b of the positive electrode outside member 57 is provided, it is highly probable that a crack CR will occur in a portion of the beads BD that is toward the radial inside EH1 (the right side in FIG. 9), as in a comparative embodiment shown in FIGS. 9 and 10. As described above, pure aluminum is used for the positive electrode collector member 51 (the crimped portion 55), while an Al—Mg alloy is used for the positive electrode outside member 57. The pure aluminum has a larger coefficient of thermal expansion than the Al—Mg alloy, so the coefficient of thermal expansion of the beads BD made of a first alloy that is a mixture of the pure aluminum and the aluminum alloy is a value between those of the pure aluminum and the aluminum alloy. That is, the beads BD (the first alloy) have a lower coefficient of thermal expansion than the crimped portion 55 (the pure aluminum). Therefore, as the beads BD formed by laser welding cool, thermal stress due to the difference in thermal expansion occurs between these beads BD and the crimped portion 55. In particular, the beads BD are formed on the outer peripheral edge portion 55p of the crimped portion 55, so thermal stress increases between the beads BD and a portion of the crimped portion 55 that is closer to the radial inside EH1 of the crimped portion 55 than these beads BD. Therefore, it is thought that the crack CR will tend occur in portions of the beads BD that are near the radial inside EH1 of the crimped portion 55.

In contrast, with the battery 1 of this example embodiment, as described above, not only are the beads 56c (the continuous bead 56b) that weld the crimped portion 55 of the positive electrode collector member 51 to the crimping seat portion 57b of the positive electrode outside member 57 provided, but the additional beads 56e (the continuous additional bead 56d) in which these beads 56c and the crimped portion 55 have solidified after being melted, are provided in a state partially overlapping with the beads 56c, on the radial inside EH1 of the beads 56c (the continuous bead 56b) (see FIGS. 6 and 7). That is, the portions on the radial inside EH1 of the crimped portion 55, of the beads BD (56c) where the crack CR tends to occur, are the additional beads 56e, instead of these beads BD (56c). These additional bead 56e are made of the second alloy described above. Therefore, the difference in thermal expansion between the additional beads 56e made of the second alloy and the crimped portion 55 around these additional beads 56e is smaller than the difference in thermal expansion between the beads BD (56c) made of the first alloy and the crimped portion 55 around these beads BD (56c), so unlike the beads BD, cracking due to a difference in thermal expansion will not easily occur in the additional beads 56e. Thus, with this battery 1, it is possible to inhibit cracking in the beads BD, so good electrical conductivity between the positive electrode outside member 57 and the crimped portion 55 of the positive electrode collector member 51 by the beads 56c is able to be ensured.

With the negative electrode as well, the crimped portion 65 of the negative electrode collector member 61 and the crimping seat portion 67b of the negative electrode outside member 67 are welded using laser light, such that the two are electrically connected and the conductive resistance between the two is reduced. More specifically, four beads 66c that form a continuous bead 66b are formed in a portion closest to an external terminal abutting portion 67f of the negative electrode outside member 67, of an outer peripheral portion 65p of the crimped portion 65.

When the inside insulating member 70 that is made of insulating resin is provided between the positive electrode collector member 51 and the battery case 10 (the case lid member 13), and the outside insulating member 80 that is made of insulating resin is provided between the positive electrode outside member 57 and the battery case 10, the temperature near the portion of each members where the laser light is emitted rises by the heat input from the laser light emission, and the insulating resin that forms both the inside insulating member 70 and the outside insulating member 80 that contact this may deform and transform or the like due to the heat, and as a result, the insulating properties may decrease. However, in the battery 1 described above, each of the beads 56c that form the continuous bead 56b, and each of the additional beads 56e that form the continuous additional bead 56d, are spot-shaped. Therefore, the first laser light L1 and the second laser light L2 are emitted intermittently, and there is time between one emission and the next emission, so during this time, heat can be transferred to another portion of the positive electrode outside member 57 and another portion of the positive electrode collector member 51, so the transfer of heat to the inside insulating member 70 and the outside insulating member 80 is able to be reduced. As a result, the battery 1 described above is able to be a highly reliable battery 1 in which deformation and transformation due to heat of the inside insulating member 70 and the outside insulating member 80 that are made of insulating resin are inhibited, while having the continuous bead 56b and the continuous additional bead 56d.

The battery 1 of this example embodiment is manufactured in the manner described below. First, the case lid member 13, the positive terminal member 50 (51, 57, and 59), the negative terminal member 60 (61, 67, and 69), the inside insulating member 70, and the outside insulating member 80 are prepared. As shown in FIG. 3, the engaging portion 53 of the positive electrode collector member 51 is covered by the cover portion 71 of the inside insulating member 70, and the extending portion 54 of the positive electrode collector member 51 is inserted through the third through-hole 73b of the inside insulating member 70, the first through-hole 13k of the case lid member 13, the fourth through-hole 81b of the outside insulating member 80, and the second through-hole 57c of the positive electrode outside member 57. Also, the head portion 59b of the positive electrode connecting bolt 59 is placed in the head portion accommodating portion 83 of the outside insulating member 80, and the external thread portion 59c is inserted through the bolt through-hole 57g of the positive electrode outside member 57. Here, the designed crimping portion 55a that is positioned at the tip end of the extending portion 54 and protrudes out from the positive electrode outside member 57 is crimped and deformed in an umbrella shape so as to spread out toward the outside to form the crimped portion 55, and the inside insulating member 70, the case lid member 13, the outside insulating member 80, and the positive electrode outside member 57 are retained between the crimped portion 55 and the engaging portion 53 of the positive electrode collector member 51. As a result, the positive electrode collector member 51 and the positive electrode outside member 57 of the positive terminal member 50 are securely fixed to the case lid member 13. The head portion 59b of the positive electrode connecting bolt 59 is engaged with the external terminal abutting portion 57f, so the positive electrode connecting bolt 59 is unable to be removed.

With the negative electrode as well, similarly, a designed crimping portion, not shown, is crimped and deformed to form the crimped portion 65, thereby retaining the inside insulating member 70, the case lid member 13, the outside insulating member 80, and the negative electrode outside member 67 between the crimped portion 65 and an engaging portion 63 of the negative electrode collector member 61. As a result, the negative electrode collector member 61 and the negative electrode outside member 67 of the negative terminal member 60 are securely fixed to the case lid member 13.

Figure 8:
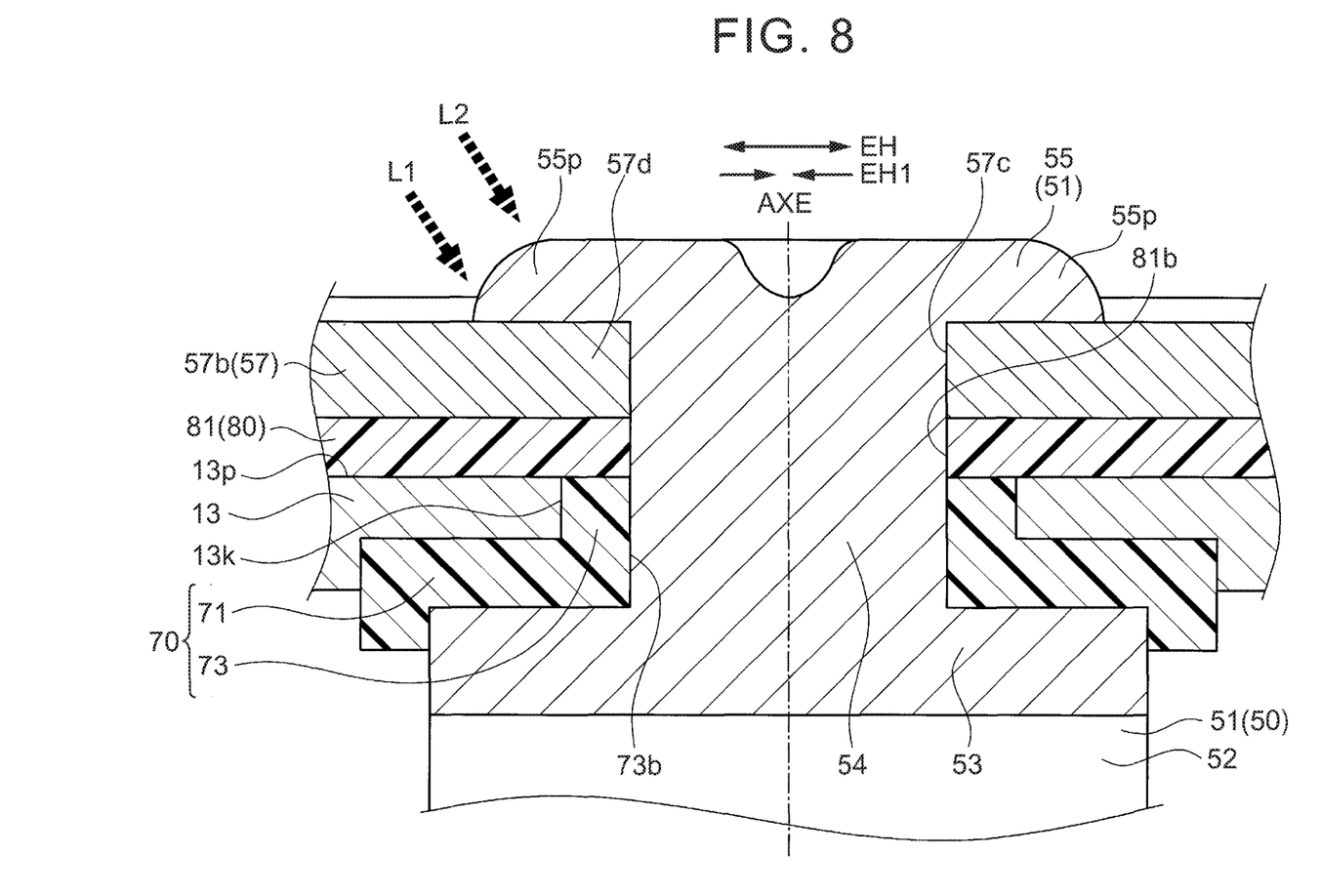
FIG. 8 is an explanatory view illustrating the formation of the beads and the additional beads using laser light, according to the example embodiment.

Next, as shown in FIG. 8, the spot-shaped first laser light L1 is emitted at a portion in the circumferential direction RH of the outer peripheral edge portion 55p of the crimped portion 55, and a portion of the positive electrode outside member 57 that is positioned below a portion of this outer peripheral edge portion 55p, without being moved for a predetermined period of time, so as to weld the outer peripheral edge portion 55p of the crimped portion 55 to the positive electrode outside member 57, and form one of the beads 56c (a bead forming step).

Next, the spot-shaped second laser light L2 is emitted toward the radial inside EH1 of the bead 56c formed earlier on the crimped portion 55, without being moved for a predetermined period of time, so as to form one of the additional beads 56e in which the portion of the bead 56c that is toward the radial inside EH1 and the crimped portion 55 have solidified after being melted (an additional bead forming step). In this example embodiment, the output power of the second laser light L2 is less than the output power of the first laser light L1. Also, the emission time of the second laser light L2 is shorter than the emission time of the first laser light L1. That is, the energy that is input as laser light when forming the additional bead 56e is smaller than the energy that is input as laser light when forming the bead 56c. This is so that, with the additional bead 56e, the crimped portion 55 will not melt all the way to the positive electrode outside member 57 that is underneath the crimped portion 55.

Then, the bead forming step and the additional bead forming step are repeated four times to form the continuous bead 56b and the continuous additional bead 56d. When forming the second and subsequent beads 56c, the first laser light L1 is emitted such that the newly formed bead 56c overlaps with part of the most recently formed bead 56c. Also, when forming the second and subsequent additional beads 56e, the second laser light L2 is emitted such that the newly formed additional bead 56e both overlaps with part of the just formed bead 56c, and overlaps with part of the most recently formed additional bead 56e. Thus, a case lid 18 with terminal members is formed. As described above, the continuous bead 56b is formed in a 9 o'clock position, in FIG. 5, on the outer peripheral edge portion 55p of the crimped portion 55.

Aside from this, the battery 1 is manufactured by a known method. That is, the collector portion 52 of the positive electrode collector member 51 of the terminal case lid 18 with terminal members is welded to the positive electrode exposed portion 21m of the electrode body 20 formed separately by a known method. Also, the collector portion 62 of the negative terminal member 60 is welded to the negative electrode exposed portion 31m of the electrode body 20. Next, the film surrounding body 17 is covered over the electrode body 20, and these are inserted into the case main body member 11, and the opening 11h of the case main body member 11 is closed with the case lid member 13. Then, the case main body member 11 and the case lid member 13 are laser welded along the entire periphery. After this, the electrolyte 90 is filled through the electrolyte filler hole 13h, and the electrolyte filler hole 13h is then hermetically sealed by the electrolyte filler hole sealing member 15. Next, initial charging and various inspections are performed on the battery 1. With this, the battery 1 is complete.

With the manufacturing method for this battery 1, one of the beads 56c is first formed in the bead forming step, and then one of the additional beads 56e is formed in the additional bead forming step, so the beads 56c are able to be inhibited from having cracks CR. As a result, the battery 1 in which good electrical conductivity between the positive electrode outside member 57 and the crimped portion 55 of the positive electrode collector member 51 is ensured by the beads 56c (the continuous bead 56b) is able to be manufactured.

Furthermore, with the manufacturing method for this battery 1, as described above, the continuous bead 56b and the continuous additional bead 56d are formed by repeatedly first forming one of the beads 56c and then forming one of the additional beads 56e, as described above. That is, after inhibiting the crack CR from occurring in the bead 56c by forming the additional bead 56e after forming the bead 56c, the next bead 56c is then formed. Therefore, a crack CR that occurs in one bead 56c will not influence the development of a crack CR in an adjacent bead 56c, so the continuous bead 56b without cracks CR and in which a plurality of beads 56c are continuous, is able to be formed.

In addition, with the manufacturing method for the battery 1 described above, in the bead forming step that is performed four times, the continuous bead 56b is formed on a portion closest to the external terminal abutting portion 57f of the positive electrode outside member 57, of the outer peripheral edge portion 55p of the crimped portion 55. As a result, the battery 1 in which the current path from the external terminal abutting portion 57f of the positive electrode outside member 57 to the continuous bead 56b is able to be as short as possible, so resistance that occurs in the positive electrode outside member 57 is as low as possible, is able to be manufactured.

While the disclosure has been described with example embodiments, the disclosure is not limited to these example embodiments. It goes without saying that the disclosure may be applied with suitable modifications within the scope of the disclosure. For example, in the example embodiment described above, the battery 1 is described as having the continuous bead 56b formed by a plurality of beads 56c that are continuous, and the continuous additional bead 56d formed by a plurality of additional beads 56e that are continuous. However, a mode in which pairs of beads, each pair including one bead 56c and one additional bead 56e, are arranged scattered in the circumferential direction RH of the crimped portion 55 (for example, in four locations each separated by 90 degrees in the circumferential direction RH) is also possible. Also, in the example embodiment described above, the battery 1 is described as being provided with one continuous bead 56b and one continuous additional bead 56d (i.e., one group of continuous beads 56c and one group of additional beads 56e). However, a mode in which a plurality of groups of continuous beads 56b and continuous additional beads 56d are arranged scattered in the circumferential direction RH of the crimped portion 55 (for example, in four locations each separated by 90 degrees in the circumferential direction RH) is also possible.

What is claimed is:
1. A battery comprising:
a battery case;
an outside member that is arranged on an outer portion of the battery case, and is made of an Al—Mg aluminum alloy or Al—Mg—Si aluminum alloy;
a collector member made of pure aluminum, which has
  i) an extending portion that extends from within the battery case, passes through a case through-hole provided in the battery case and a member through-hole that passes through the outside member, and protrudes out of the battery case, and
  ii) a crimped portion that spreads out toward an outside of the member through-hole from the extending portion, and circularly covers a periphery of the member through-hole in the outside member, and fixes the extending portion and the outside member to the battery case;
a bead that is made of a first alloy derived from the crimped portion and the outside member, and electrically connects an outer peripheral edge portion of the crimped portion to the outside member; and
an additional bead that is made of a second alloy derived from the bead and the crimped portion, and is positioned farther toward a radial inside of the crimped portion than the bead.

2. The battery according to claim 1, wherein
the bead
    forms a continuous bead in which a plurality of spot-shaped beads are continuous and partially overlapping each other in a circumferential direction of the crimped portion;
the additional bead
    forms a continuous additional bead in which a plurality of spot-shaped additional beads are continuous and partially overlapping each other in the circumferential direction of the crimped portion;
the outside member includes a conductive portion that abuts against, and is electrically connected to, an external terminal; and
the continuous bead
    is positioned on a portion of the outer peripheral edge portion of the crimped portion, which is closest to the conductive portion of the outside member.

3. The battery according to claim 1, further comprising:
an insulating member made of insulating resin, which insulates the collector member and the outside member from the battery case.

4. The battery according to claim 1, wherein
the additional bead does not contact the outside member.

5. A manufacturing method for a battery that includes
a battery case;
an outside member that is arranged on an outer portion of the battery case, and is made of an Al—Mg aluminum alloy or Al—Mg—Si aluminum alloy;
a collector member made of pure aluminum, which has
    i) an extending portion that extends from within the battery case, passes through a case through-hole provided in the battery case and a member through-hole that passes through the outside member, and protrudes out of the battery case, and
    ii) a crimped portion that spreads out toward an outside of the member through-hole from the extending portion, and circularly covers a periphery of the member through-hole in the outside member, and fixes the extending portion and the outside member to the battery case;
a bead that is made of a first alloy derived from the crimped portion and the outside member, and electrically connects an outer peripheral edge portion of the crimped portion to the outside member; and
an additional bead that is made of a second alloy derived from the bead and the crimped portion, and is positioned farther toward a radial inside of the crimped portion than the bead, the manufacturing method comprising:
a bead forming step of forming the by emitting a first laser light toward a portion of an outer peripheral edge portion of the crimped portion and a portion of the outside member that is covered by the portion of the outer peripheral edge portion; and
an additional bead forming step of forming the additional bead by emitting a second laser light to an inside of the formed bead in a radial direction of the crimped portion.

6. The manufacturing method according to claim 5, wherein
the bead
    forms a continuous bead in which a plurality of spot-shaped beads are continuous and partially overlapping each other in a circumferential direction of the crimped portion;
the additional bead
    forms a continuous additional bead in which a plurality of spot-shaped additional beads are continuous and partially overlapping each other in the circumferential direction of the crimped portion;
the bead forming step
    is a step of forming the spot-shaped beads by fixing a position where the first laser light is emitted and emitting the first laser light;
the additional bead forming step
    is a step of forming the spot-shaped additional beads by fixing a position where the second laser light is emitted and emitting the second laser light; and
the continuous bead and the continuous additional bead are formed by performing the bead forming step and the additional bead forming step alternately.

7. The manufacturing method according to claim 6, wherein
the outside member includes a conductive portion that abuts against, and is electrically connected to, an external terminal; and
in the bead forming step, the continuous bead is formed on a portion of the outer peripheral edge portion of the crimped portion, which is closest to the conductive portion of the outside member.

8. The manufacturing method according to claim 5, wherein
emission energy of the second laser light is smaller than the emission energy of the first laser light.

9. The manufacturing method according to claim 5, wherein
the bead
    forms a continuous bead in which a plurality of spot-shaped beads are continuous and partially overlapping each other in a circumferential direction of the crimped portion;
the additional bead
    forms a continuous additional bead in which a plurality of spot-shaped additional beads are continuous and partially overlapping each other in the circumferential direction of the crimped portion; and
the second laser light is emitted such that a newly formed spot-shaped additional bead of the plurality of spot-shaped additional beads overlaps with a most recently formed spot-shaped bead of the plurality of spot-shaped beads and a most recently formed spot-shaped additional bead of the plurality of spot-shaped additional beads.

* * * * *